(12) United States Patent
Haridas et al.

(10) Patent No.: US 7,284,050 B1
(45) Date of Patent: Oct. 16, 2007

(54) METHOD AND SYSTEM FOR A VOICE MULTICAST HARDWARE ACCELERATOR

(75) Inventors: Sriram Haridas, San Jose, CA (US); Louis Couture, Santa Barbara, CA (US)

(73) Assignee: Cisco Technology, Inc., San Jose, CA (US)

( * ) Notice: Subject to any disclaimer, the term of this patent is extended or adjusted under 35 U.S.C. 154(b) by 665 days.

(21) Appl. No.: 09/818,062

(22) Filed: Mar. 26, 2001

(51) Int. Cl.
*G06F 15/173* (2006.01)
*H04M 11/00* (2006.01)
*H04H 1/00* (2006.01)

(52) U.S. Cl. .................. 709/225; 709/238; 379/93.07; 370/312

(58) Field of Classification Search .............. 709/227, 709/238, 224, 226, 225; 279/1.02, 1.03, 279/67.1, 88.17, 88.19, 88.21, 88.1; 379/93.07, 379/202.01; 370/312
See application file for complete search history.

(56) References Cited

U.S. PATENT DOCUMENTS

| | | | |
|---|---|---|---|
| 5,434,863 A * | 7/1995 | Onishi et al. ................ 370/402 |
| 5,541,927 A | 7/1996 | Kristol et al. ............... 370/94.2 |
| 5,684,797 A | 11/1997 | Aznar et al. ................. 370/390 |
| 5,778,187 A | 7/1998 | Monteiro et al. ...... 395/200.61 |
| 5,905,718 A | 5/1999 | Kurokami et al. .......... 370/328 |
| 5,905,871 A | 5/1999 | Buskens et al. ....... 395/200.75 |
| 5,983,005 A | 11/1999 | Monteiro et al. ...... 395/200.61 |
| 6,038,592 A | 3/2000 | Verplanken et al. ........ 709/215 |
| 6,049,546 A | 4/2000 | Ramakrishnan ............. 370/412 |
| 6,049,878 A | 4/2000 | Caronni et al. ............. 713/201 |
| 6,101,187 A | 8/2000 | Cukier et al. ................ 370/396 |
| 6,101,551 A | 8/2000 | Kanoh ........................ 709/245 |
| 6,108,335 A | 8/2000 | Ganmukhi et al. .......... 370/395 |
| 6,119,163 A | 9/2000 | Monteiro et al. ........... 709/227 |
| 6,125,114 A | 9/2000 | Blanc et al. ................. 370/389 |
| 6,144,662 A | 11/2000 | Colmant et al. ............ 370/390 |
| 6,160,585 A | 12/2000 | Schmidt et al. ............. 348/423 |
| 6,304,574 B1 * | 10/2001 | Schoo et al. ................. 370/401 |
| 6,320,958 B1 * | 11/2001 | Sekine ................... 379/406.01 |
| 6,347,090 B1 * | 2/2002 | Ooms et al. ................. 370/428 |
| 6,584,110 B1 * | 6/2003 | Mizuta et al. ............... 370/401 |
| 6,600,735 B1 * | 7/2003 | Iwama et al. ................ 370/352 |
| 6,651,225 B1 * | 11/2003 | Lin et al. ......................... 716/4 |
| 6,654,455 B1 * | 11/2003 | Isaka ...................... 379/202.01 |
| 6,925,641 B1 * | 8/2005 | Elabd .......................... 718/101 |
| 6,959,072 B1 * | 10/2005 | Lee ............................... 379/76 |

* cited by examiner

*Primary Examiner*—Ario Etienne
*Assistant Examiner*—El Hadji Sall
(74) *Attorney, Agent, or Firm*—Blakely, Sokoloff, Taylor & Zafman LLP (57) ABSTRACT

A method and system for a voice multicast hardware accelerator are disclosed in which a network device or system includes a host system coupled to a memory to store data and a line card to interface with a plurality of user devices. The host system is to receive a network packet including voice data, to store the voice data in the memory, and to send a voice packet related to the voice data to the line card without duplication. The voice packet includes descriptor fields for multicasting the voice data. The line card is to multicast selectively the voice data stored in the memory to the plurality of user devices based on the descriptor fields in the voice packet. A multicast hardware accelerator can be used to multicast selectively the voice data.

20 Claims, 6 Drawing Sheets

METHOD AND SYSTEM FOR A VOICE MULTICAST HARDWARE ACCELERATOR

FIELD OF THE INVENTION

The present invention pertains to the field of voice communication. More particularly, the present invention relates to voice multicasting. Specifically, the present invention relates to a method and system for a voice multicast hardware accelerator.

BACKGROUND OF THE INVENTION

Today, communication data ("voice packet") can reach a number of users over a number of interconnected networks. For example, during a conferencing or multicast session, a source can send a voice packet that is multicasted to multiple recipients or users over the Internet ("voice multicasting"). Typically, a router receives the voice packet from a network and determines how to forward the packet to desired users. In prior art routers, voice multicasting is performed in software by duplicating and storing the duplicated packet for each user. The stored packets are then forwarded to the users.

Figure 1:
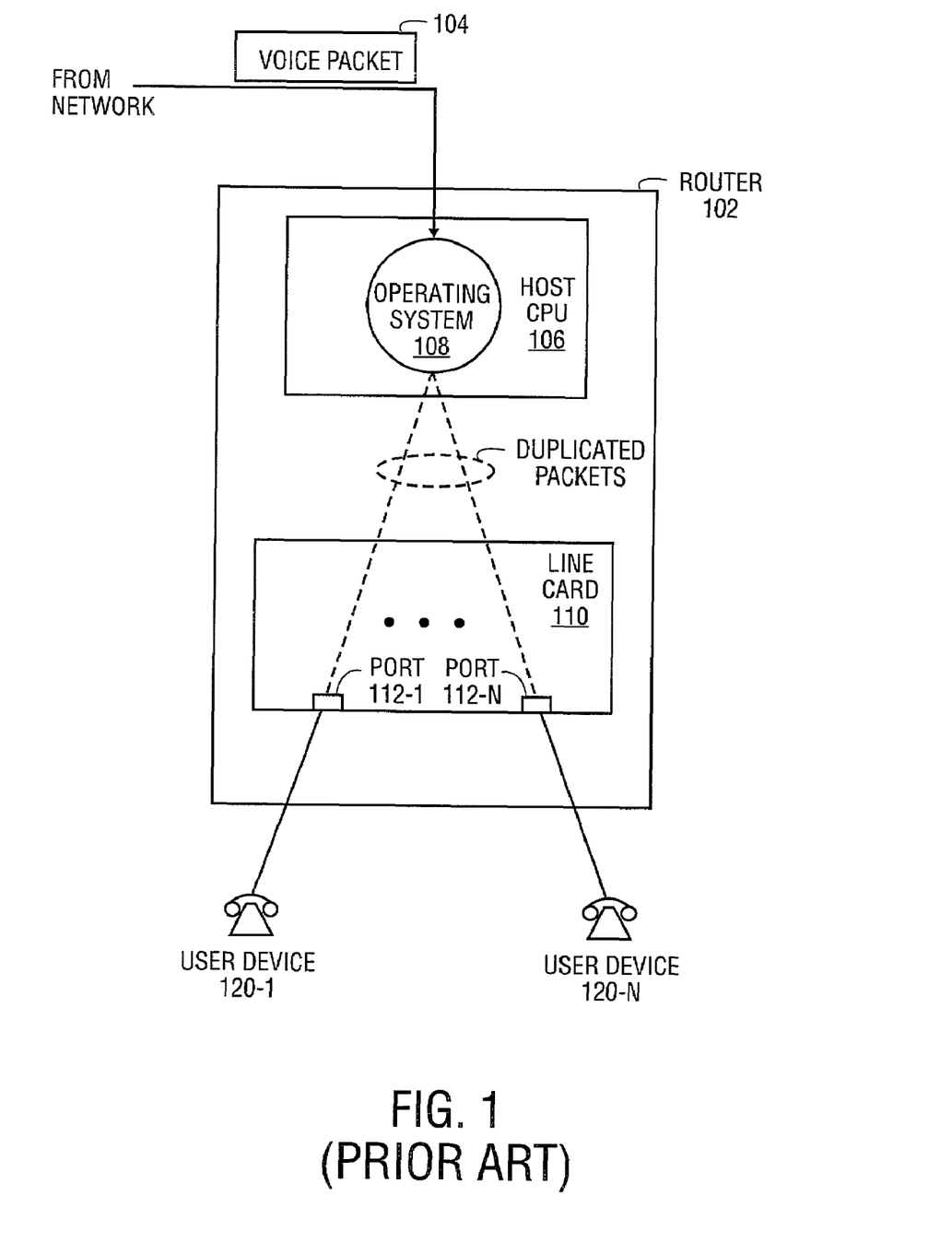
FIG. 1 illustrates a prior art router to perform voice multicasting in software for a plurality of user devices.

FIG. 1 illustrates a prior art router 102 to perform voice multicasting in software for a plurality of user devices 120-1 through 120-N. Referring to FIG. 1, prior art router 102 includes a host central processing unit (CPU) 106 communicating with a line card 110 via operating system 108. Host CPU 106 and operating system 108 can receive a voice packet 104 for voice multicasting. Line card 110 includes a plurality of ports 112-1 through 112-N coupled to respective user devices 120-1 through 120-N, which are illustrated as phone devices.

To perform voice multicasting of voice packet 104, e.g., to user devices 120-1 through 120-N, operating system 108 duplicates voice packet 104 for each of the user devices 120-1 through 120-N and stores the duplicated packets in a memory (not shown). Operating system 108 then sends a duplicated voice packet 104 one at a time to line card 110 so that line card 110 can output the packets on ports 112-1 through 112-N. The outputted packets are then delivered to user devices 120-1 through 120-N.

A disadvantage of performing voice multicasting using the prior software method is that a single packet must be duplicated for each user device in the multicast session, which requires extensive host CPU resources. That is, as shown in FIG. 1, host CPU 106 may need to duplicate voice packet 104 up to N times for a multicast session. Another disadvantage of performing voice multicasting using the prior software method is that it requires extensive memory utilization to store the duplicated packets, which adversely affects other time sensitive software programs that may require host CPU processing time. As such, performing voice multicasting using the prior software method can reduce system performance.

SUMMARY OF THE INVENTION

A method and system for a voice multicast hardware accelerator are disclosed. In one embodiment, a network device or system includes a host system coupled to a memory to store data and a line card to interface with a plurality of user devices. The host system is to receive a network packet including voice data, to store the voice data in the memory, and to send a voice packet related to the voice data to the line card without duplication. The voice packet includes descriptor fields for multicasting the voice data. The line card is to multicast selectively the voice data stored in the memory to the plurality of user devices based on the descriptor fields in the voice packet. A multicast hardware accelerator can be used to multicast selectively the voice data.

Other features and advantages of the present invention will be apparent from the accompanying drawings, and from the detailed description, which follows below.

BRIEF DESCRIPTION OF THE DRAWINGS

The present invention is illustrated by way of example, and not limitation, by the figures of the accompanying drawings in which like references indicate similar elements and in which.

DETAILED DESCRIPTION

A method and system for a voice multicast hardware accelerator are described. In one embodiment, a network device or system includes a host system coupled to a memory to store data and a line card to interface with a plurality of user devices. The host system is to receive a network packet including voice data, to store the voice data in the memory, and to send a voice packet related to the voice data to the line card without duplication. The voice packet includes descriptor fields. The line card is to multicast selectively the voice data stored in the memory to the plurality of user devices based on the descriptor fields in the voice packet. A multicast hardware accelerator can be used to multicast selectively the voice data.

The multicasting techniques described herein avoid duplicating packets such as voice packets for a multicast session. As such, memory utilization is improved by not having to store duplicated packets. The multicasting techniques described herein can also reduce system load by using a multicast hardware accelerator to read voice data from a memory. Furthermore, the multicast hardware accelerator can improve system performance by providing an accelerated method of multicasting data to multiple recipients or users.

In the following description, multicasting techniques are described with respect to voice packets or data. Nevertheless, the multicasting techniques described herein are not intended to be limited to any particular type of packet or data and can be implemented with other types of packets and data related to, e.g., audio and/or video data.

Furthermore, in the following description, multicasting techniques are described with respect to network routers. Nevertheless, the multicasting techniques described herein are not intended to be limited to any particular type of network device and can be performed or implemented by other types of network devices such as, for example, network servers, switches, bridges, hubs, or gateways.

Figure 2:
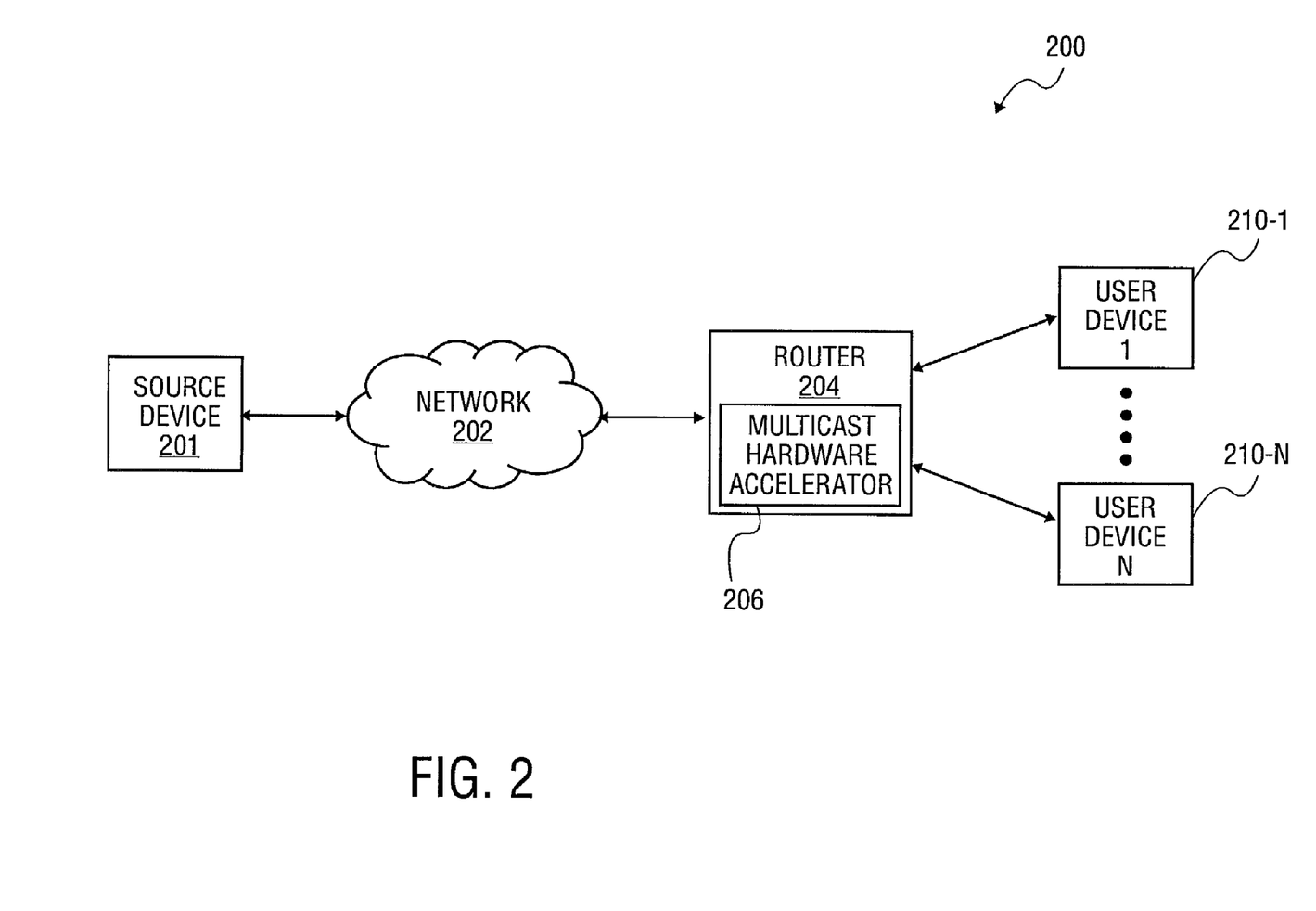
FIG. 2 illustrates an exemplary networking environment in which the present invention can be practiced.

FIG. 2 illustrates an exemplary networking environment 200 in which the present invention can be practiced. Referring to FIG. 2, networking environment 100 includes a source device coupled to a router 204 via network 202. Router 204 is coupled to a plurality of user devices 1 (210-1) through N (210-N). Router 204, however, can be coupled to any number of networks, source devices, and user devices.

In the example of FIG. 2, source device 201 can initiate a voice multicasting session with user devices 1 through N. Source device 201 can provide voice packets or data for voice multicasting. In one embodiment, source device 201 is a general purpose phone device. In an alternative embodiment, source device 201 is a wireless phone device, which can connect to network 202. In other embodiments, source device 201 can be a private branch exchange (PBX) device or a general purpose computer, server, or workstation to generate voice packets or data for voice multicasting.

Network 202 can represent any number of types of networks. For example, network 202 can be a local area network LAN such as an Ethernet network or a wide area network WAN such as an Asynchronous Transfer Mode (ATM) network, frame relay network, or the Internet. Network 202 can receive and transmit packets or data on a wired or wireless medium. In the following embodiments, network 202 represents an Internet network that supports the Internet Protocol (IP). Source device 201, router 204, and user devices 1 through N can thus support voice over IP multicasting.

Router 204 is a network device that routes and forwards packets or data to user devices 1 through N. In one embodiment, router 204 performs IP layer 3 service, which provides routing and forwarding functions so that a packet can reach its destination using an optimal path on the Internet. In other embodiments, router 204 performs IP multicasting of packets or data to user devices 1 through N. For example, router 204 can multicast voice packets or data ("voice multicasting") from source device 201 to user devices 1 through N using the multicasting techniques described herein.

To facilitate voice multicasting, router 204 includes multicast hardware accelerator 206. In one embodiment, multicast hardware accelerator 206 is a programmable device that can access data in a memory device and quickly forward the data to multiple users or recipients. For example, multicast hardware accelerator 206 can be a field programmable gate array (FPGA) device that is to multicast voice data to user devices 1 through N as described herein. User devices 1 through N can be the same type of device as source device 201, or alternatively, user devices 1 through N can be digital signal processing devices (DSPs).

Figure 3:
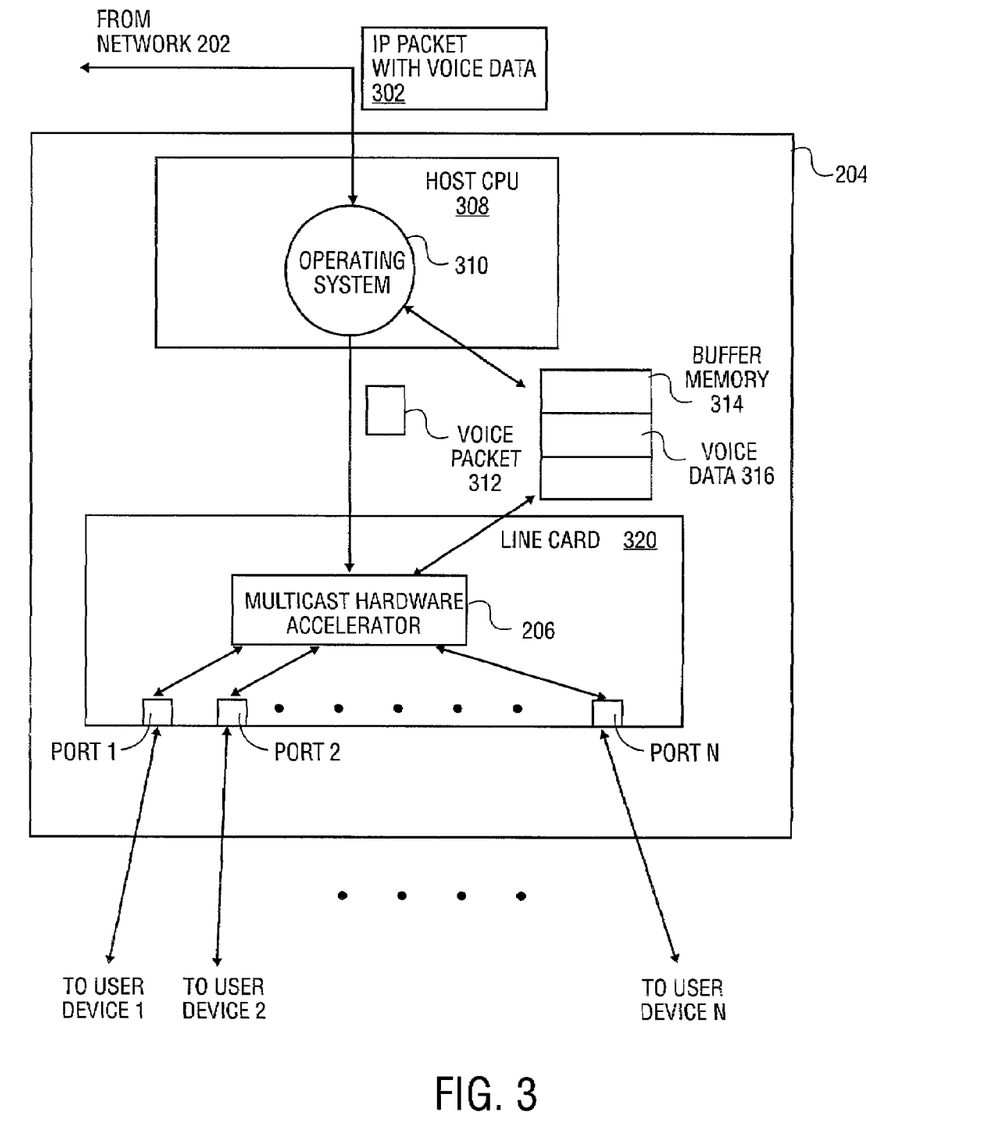
FIG. 3 illustrates a block diagram of the router of FIG. 2 to perform voice multicasting using a multicast hardware accelerator according to one embodiment.

FIG. 3 illustrates a block diagram of router 204 of FIG. 2 to perform voice multicasting using multicast hardware accelerator 206 according to one embodiment. Referring to FIG. 3, router 204 includes a host CPU 308 operating with operating system 310 (collectively "host system"). The host system can receive an EP packet with voice data 302 from network 202, which may be part of the Internet.

Figure 4:
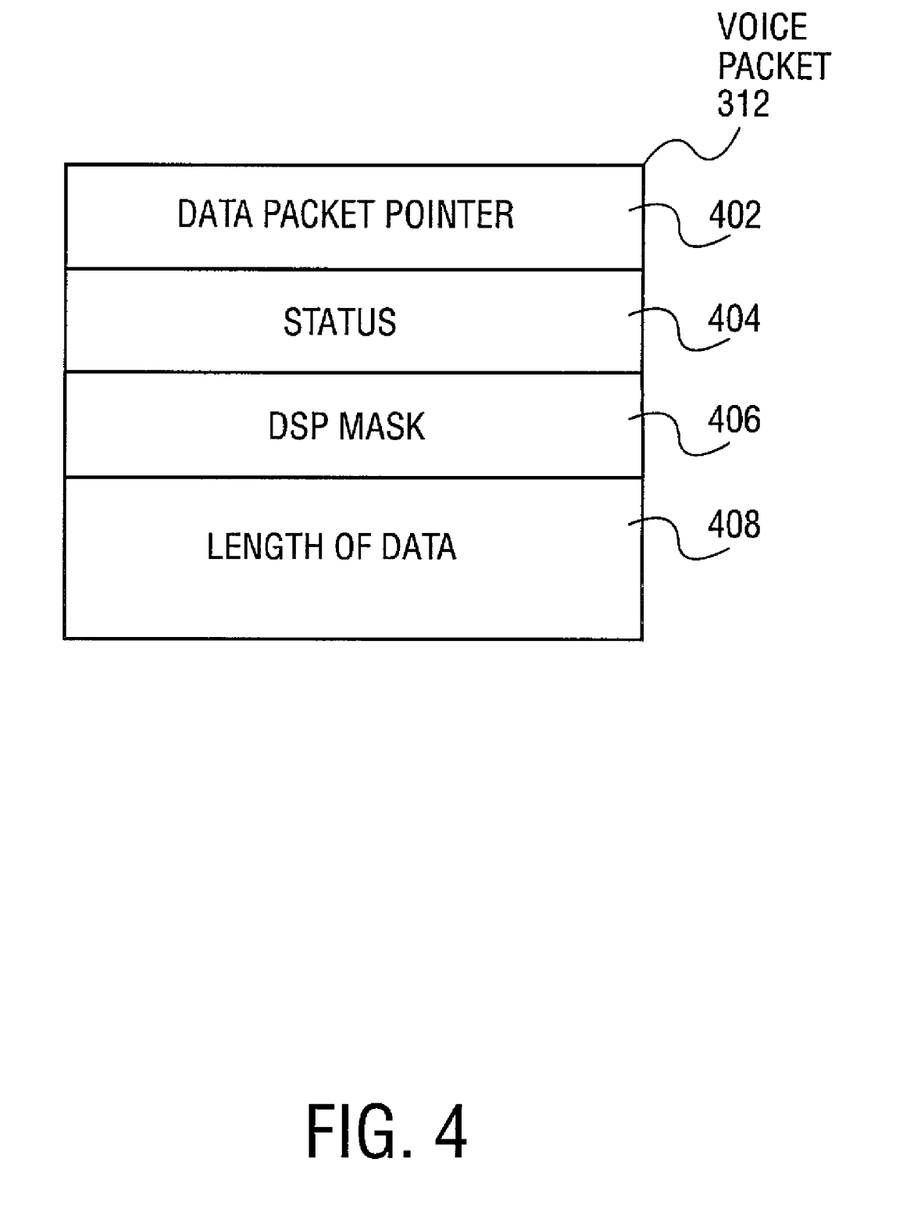
FIG. 4 illustrates a block diagram of a voice packet with descriptor fields according to one embodiment.

The host system of router 204 can parse the IP packet with voice data 302 to extract voice data 316. The host system can store voice data 316 in buffer memory 314. The host system also generates voice packet 312 that relates to voice data 316 stored in buffer memory 314. Voice packet 312 includes descriptor fields, e.g., as shown in FIG. 4, which are used by multicast hardware accelerator 206 to multicast selectively voice data 316 to user devices 1 through N. The host system sends voice packet 312 to multicast hardware accelerator within line card 320.

Line card 320 is an interface for router 204 that can forward voice data 316 to user devices 1 through N via ports 1 through N, respectively. In other embodiments, line card 320 can receive packets and data for router 204. Although a single line card 320 is shown in FIG. 3, router 204 can have any number of line card interfaces. Furthermore, line card 320 may have any number of ports operating at different speeds and supporting a plurality of connections.

Multicast hardware accelerator 206 operating within line card 320 processes voice packet 312, i.e., descriptor fields 402 through 408 as shown in FIG. 4, to determine where in buffer memory 314 to retrieve voice data 316 and to which user devices 1 through N to send voice data 316. For example, multicast hardware accelerator 206 can be a FPGA device that is programmed to process descriptor fields 402 through 408 to multicast voice data 316 stored in buffer memory 314. The operations of multicast hardware accelerator 206 will be described in further detail below.

FIG. 4 illustrates a block diagram of voice packet 312 with descriptor fields 402 through 408 according to one embodiment. Referring to FIG. 4, voice packet 312 includes a data packet pointer field 402, status field 404, digital signal processing (DSP) mask field 406, and length of data field 408. In one embodiment, multicast hardware accelerator 206 is programmed or hardwired to process descriptor fields 402 through 408 to multicast voice data 316. In other embodiments, multicast hardware accelerator 206 can be programmed or hardwired to perform other types of operations such as receiving packets or data on ports 1 through N.

Data packet pointer field 402 stores the location or points to the first byte of voice data 316 within buffer memory 314 and length of data field 408 stores the length or total number of bytes for voice data 316 stored in buffer memory 314. That is, if voice data 316 is for multicasting, multicast hardware accelerator 206 will use data packet pointer field 402 and length of data field 408 to retrieve and multicast voice data 316 at a location in buffer memory 314 indicated by data packet pointer field 402 having a total number of bytes indicated by length of data field 408.

Status field 404 stores information relating to data type for voice packet 312, e.g., whether voice packet 312 is related to a new packet or is related to multicast voice data 316. DSP mask field 406 stores a mask or a bit field map for multicasting voice data 316 on ports 1 through N to user devices 1 through N (or digital signal processors DSPs). For example, if voice data 316 is required to be multicasted on ports 1, 3, 5 and 7 a bit field mask such as, for example, "0xAA" can be used for DSP mask field 406. Multicast hardware accelerator can interpret a DSP mask, e.g., "0xAA", to send voice data 316 on ports 1, 3, 5, and 7.

Figure 5A:
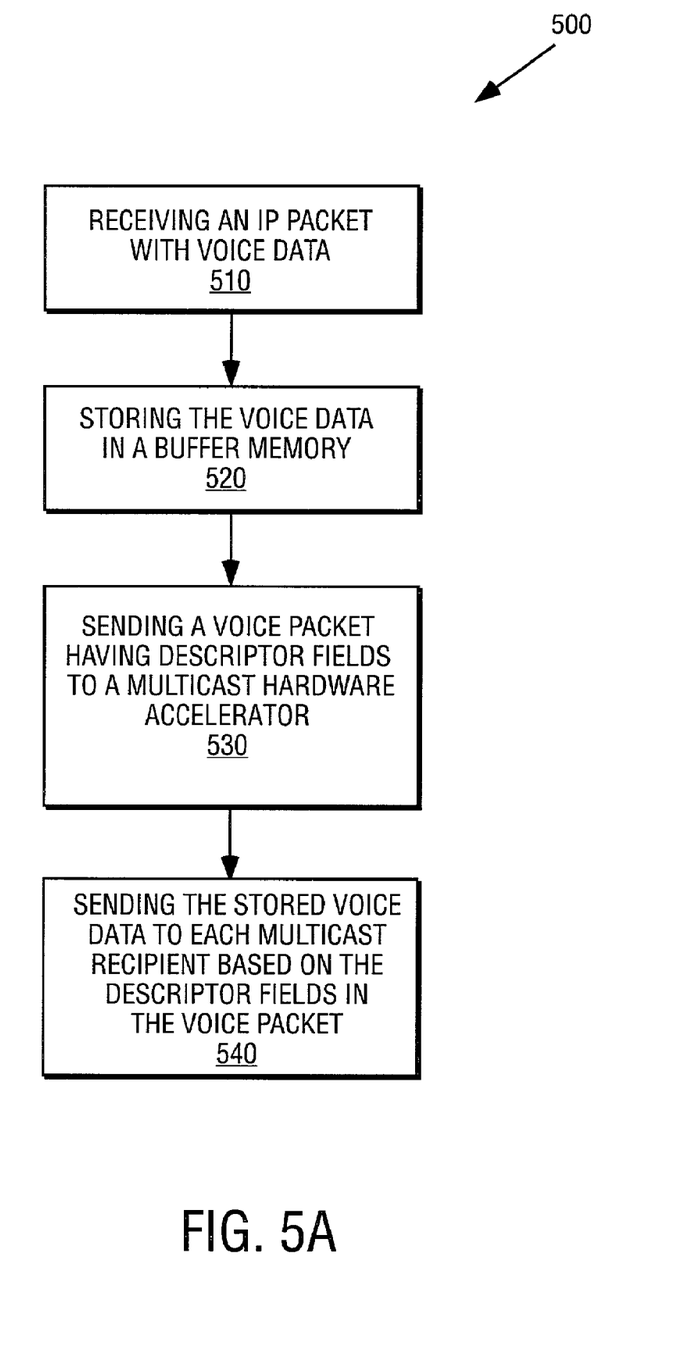
FIG. 5A illustrates a flow diagram of an operation to multicast voice data according to one embodiment.

FIG. 5A illustrates a flow diagram of an operation 500 to multicast voice data 316 according to one embodiment. Initially, operation 500 begins at operation 510.

At operation 510, an IP packet with voice data 302 is received, which includes voice data 316 that is to be multicasted to a plurality of user devices. For example, router 204 can be used to multicast voice data 316 to user devices 1 through N.

At operation 520, voice data 316 is stored in buffer memory 314. In one embodiment, the host system that includes host CPU 308 and operating system 310 that processes IP packet with voice data 302 and extracts voice data 316. The host system then store voice data 316 in buffer memory 314.

At operation 530, the host system generates and sends voice packet 312 to multicast hardware accelerator 206 in line card 320. The voice packet includes descriptor fields 402 through 408, which are used by multicast hardware accelerator 206 to multicast voice data 316.

At operation 540, voice data 316 stored in buffer memory 314 is sent to each multicast recipient (e.g., user devices 1 through N) by multicast hardware accelerator 206 based on descriptor fields 402 through 408 in voice packet 312.

Figure 5B:
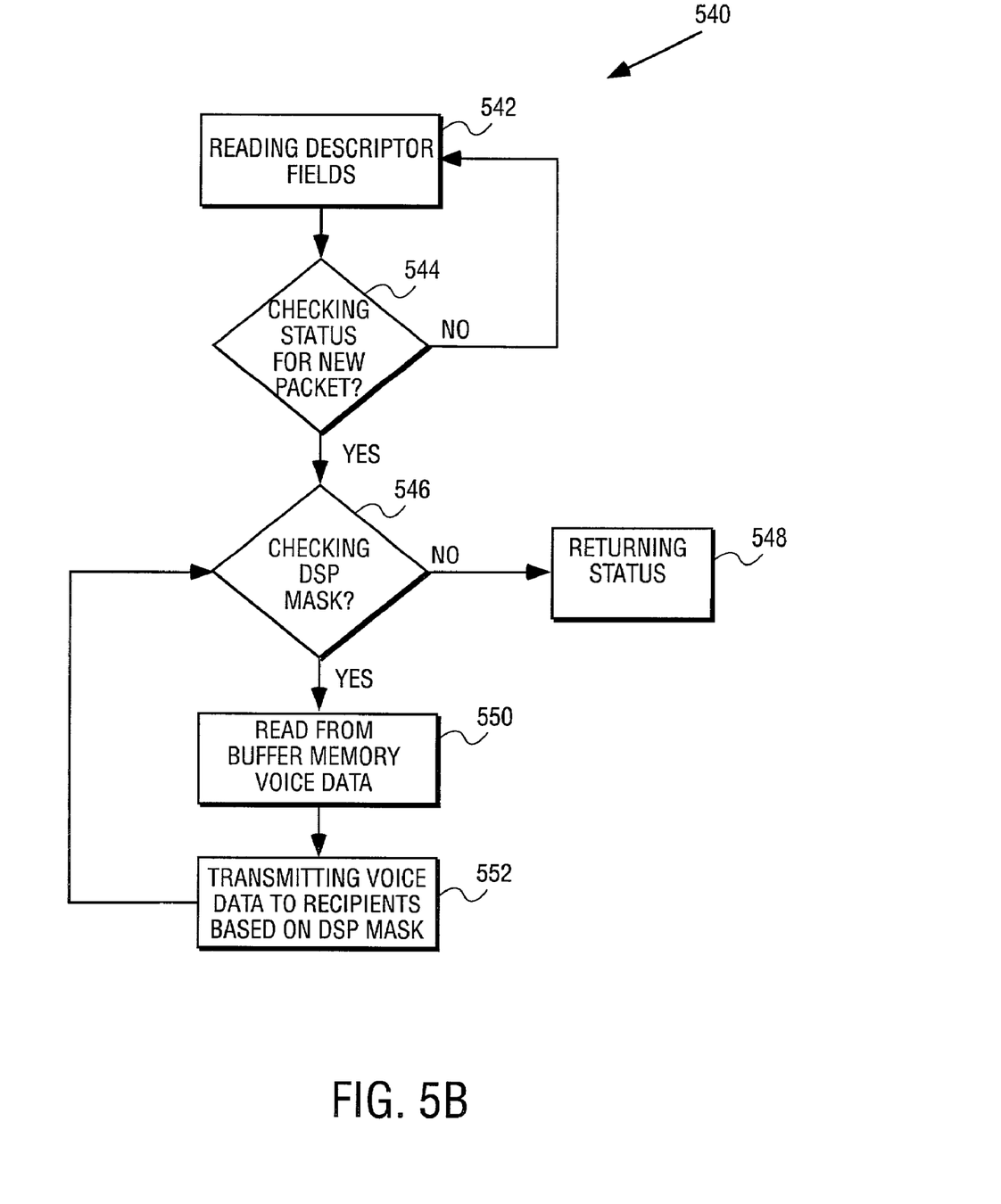
FIG. 5B illustrates a detailed flow diagram of the operation of FIG. 5A to send voice data for multicasting based on the descriptor fields of FIG. 4.

FIG. 5B illustrates a detailed flow diagram of the operation 540 of FIG. 5A to send voice data for multicasting based on the descriptor fields 402 through 408 of FIG. 4. Initially, operation 540 begins at operation 542.

At operation 542, descriptor fields 402 through 408 of voice packet 312 are read by multicast hardware accelerator 206.

At operation 542, a status for a new packet is checked. For example, multicast hardware accelerator 206 can determine the status of a new packet by checking status field 404. If the status is not for a new packet, operation 544 returns to operation 542 to wait for another voice packet.

At operation 544, if status field 404 indicates a new packet, DSP mask field 406 is checked for destinations in which to multicast voice data 316.

At operation 546, if the status indicates that it is for a new packet, DSP mask field 406 is checked. For example, DSP mask field 406 may include a bit map to multicast voice data 316 to desired recipients or user devices, e.g., user devices 1 through N. Furthermore, a check is made to determine if voice data 316 has been sent to all the desired recipients.

At operation 548, if voice data 316 has been sent to all desired recipients in the multicast session, operation 540 returns a status that all desired recipients have received the multicasted voice data 316.

At operation 550, if all of the desired recipients have not received voice data 316, voice data 316 is read for a desired recipient based on the DSP mask field 406.

At operation 552, voice data 316 is transmitted to the desired recipient by multicast hardware accelerator 206.

The above operations allow a hardware implementation to multicast data without having to duplicate packets. Although one hardware implementation includes a FPGA, other hardware implementations can be used for the above operations such as discrete hardware or firmware. For example, one or more application specific integrated circuits (ASICs) could be programmed to perform the above multicasting operations. In another example, the multicasting operations can be implemented in one or more ASICs on a line card. In another example, static programmable gate arrays (SPGA) can be used to implement the multicasting operations described herein. In yet another example, a combination or hardware and software could be used to implement the multicasting operations described herein.

Thus, a method and system for a voice multicast hardware accelerator have been described. In the foregoing specification the invention has been described with reference to specific exemplary embodiments thereof. It will, however, be evident that various modifications and changes may be made thereto without departing from broader spirit and scope of the invention as set forth in the appended claims. The specification and drawings are, accordingly, to be regarded in an illustrative sense rather a restrictive sense.

What is claimed is:

1. A method of performing voice multicasting with a router, the method comprising:
   receiving a network packet that includes voice data;
   storing the voice data in a memory;
   generating a voice packet that includes a digital signal processing (DSP) mask field;
   sending the voice packet to a line card having a plurality of ports;
   retrieving the voice data from the memory; and
   multicasting the voice data on the plurality of ports as selected by the DSP mask field, wherein the DSP mask field comprise a bit field map having a plurality of bits in which each one of the plurality of bits selects one of the corresponding plurality of ports.

2. The method of claim 1, wherein the voice packet further includes descriptor fields for retrieving the voice data from the memory for multicasting.

3. The method of claim 1, wherein multicasting the voice data is without duplicating packets.

4. The method of claim 1, wherein the network packet is an Internet Protocol (IP) packet.

5. A digital processing system comprising:
   a host system to receive a network packet that includes voice data, store the voice data in a memory, and generate a voice packet that includes a digital signal processing (DSP) mask field; and
   a line card coupled to the host system, the line card having a plurality of ports, the line card to receive the voice packet, retrieve the voice data from the memory, and multicast the voice data on the plurality of ports as selected by the DSP mask field, wherein the DSP mask field comprise a bit field map having a plurality of bits in which each one of the plurality of bits selects one of the corresponding plurality of ports.

6. The digital processing system of claim 5, wherein the voice packet further includes descriptor fields for retrieving the voice data from the memory for multicasting.

7. The digital processing system of claim 5, wherein multicasting the voice data is without duplicating packets.

8. The digital processing system of claim 5, wherein the network packet is an Internet Protocol (TP) packet.

9. An apparatus comprising:
   means for receiving a network packet that includes voice data;
   means for storing the voice data;
   means for generating a voice packet that includes a digital signal processing (DSP) mask field;
   means for receiving the voice packet;
   means for retrieving the voice data from the means for storing the voice data; and
   means for multicasting the voice data on a plurality of ports as selected by the DSP mask field wherein the DSP mask field comprise a bit field map having a plurality of bits in which each one of the plurality of bits selects one of the corresponding plurality of ports.

10. The apparatus of claim 9, wherein the voice packet further includes descriptor fields for retrieving the voice data from the means for storing the voice data.

11. The apparatus of claim 9, wherein multicasting the voice data is without duplicating packets.

12. The apparatus of claim 9, wherein the network packet is an Internet Protocol (IP) packet.

13. A network device comprising:
   a host system including a host central processing unit (CPU) and an operating the system, the host system to receive a network packet that includes voice data;
   the CPU to store the voice data in a memory and generate a voice packet that includes a digital signal processing (DSP) mask field; and
   a line card coupled to the host system, the line card having a plurality of ports to interface to user devices, the line card to receive the voice packet from the host system, retrieve the voice data from the memory, and to multicast the voice data on the plurality of ports as selected by the DSP mask field wherein the DSP mask field comprise a bit field map having a plurality of bits in which each one of the plurality of bits selects one of the corresponding plurality of ports.

14. The network device of claim 13, wherein the voice packet further includes descriptor fields for retrieving the voice data from the memory for multicasting.

15. The network device of claim 13, wherein the line card multicasts the voice data without duplicating packets.

16. The network device of claim 13, wherein the network packet is an internet Protocol (IP) packet.

17. An application specific integrated circuit (ASIC) storing instructions comprising:
   receiving a network packet that includes voice data;
   storing the voice data in a memory;
   generating a voice packet that includes a digital signal processing (DSP) mask field;
   sending the voice packet to a line card having a plurality of ports;
   retrieving the voice data from the memory; and
   multicasting the voice data on the plurality of ports as selected by the DSP mask field, wherein the DSP mask field comprise a bit field map having a plurality of bits in which each one of the plurality of bits selects one of the corresponding plurality of ports.

18. The application specific integrated circuit of claim 17, wherein the voice packet further includes descriptor fields for retrieving the voice data from the memory for multicasting.

19. The application specific integrated circuit of claim 17, wherein multicasting the voice data is without duplicating packets.

20. The application specific integrated circuit of claim 17, wherein the network packet is an Internet Protocol (IP) packet.

* * * * *